No. 892,886. PATENTED JULY 7, 1908.
W. H. PREST.
VESSEL CLOSURE.
APPLICATION FILED SEPT. 11, 1907.

WITNESSES
Louis C. Starke
John K. Brachvogel

INVENTOR
Walter H. Prest
BY
ATTORNEYS

UNITED STATES PATENT OFFICE.

WALTER HENRY PREST, OF WEBBWOOD, ONTARIO, CANADA.

VESSEL-CLOSURE.

No. 892,886.  Specification of Letters Patent.  Patented July 7, 1908.

Application filed September 11, 1907. Serial No. 392,323.

*To all whom it may concern:*

Be it known that I, WALTER HENRY PREST, a citizen of Canada, and a resident of Webbwood, in the Province of Ontario and Dominion of Canada, have invented a new and Improved Vessel-Closure, of which the following is a full, clear, and exact description.

This invention relates to vessel closures, and it is particularly useful in connection with devices of this character employed for sealing jars and the like.

The object of the invention is to provide a simple, strong and durable vessel closure, having means for permitting the escape of excess steam generated in the preparation of preserves and the like.

A further object of the invention is to provide a vessel closure having an adjustable escape valve, which can be regulated to permit the escape of steam or other vapors from the jar at any desired pressure.

The invention consists in the construction and combination of parts to be more particularly described hereinafter and fully set forth in the claims.

Reference is to be had to the accompanying drawings, in which

Figure 1:
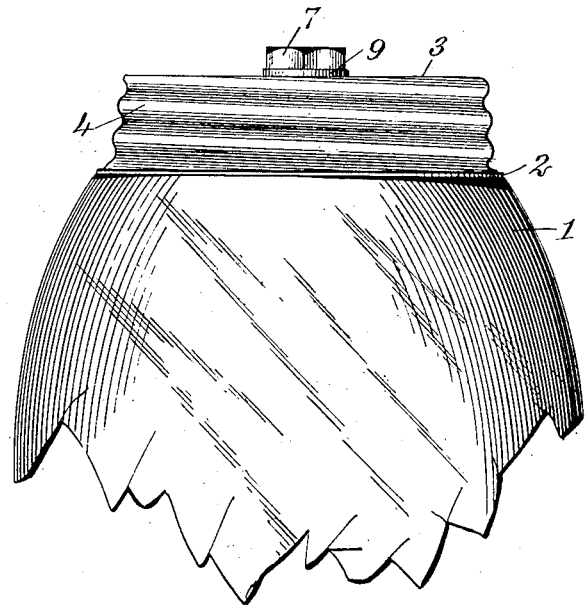
Figure 2:
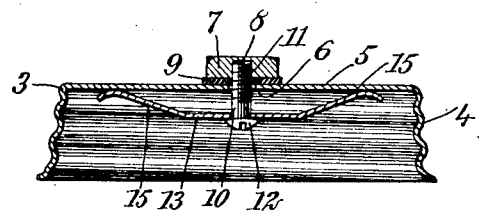
Figure 3:
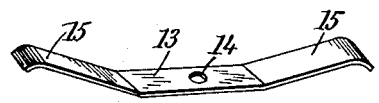

Figure 1 represents the upper portion of a fruit jar showing my closure applied thereto; Fig. 2 is a vertical cross section through the cover showing the escape valve; and Fig. 3 is a perspective view of a detail.

Like characters of reference indicate corresponding parts in all the views.

Before proceeding to a more detailed explanation of my invention it should be understood that preserves of fruit, vegetables and the like, are kept in sealed vessels to insure the preservation of the same and to prevent the admission of air to the contents of the vessels. After the preserves are prepared by boiling, cooking or in other ways, they are placed in jars and allowed to cool partially, and the jars are then sealed, or the preserves are allowed to cool in the unsealed jars and are re-heated before the sealing takes place. The object of this operation is to destroy any germs which may have come in contact with the preserves or to expel the air from the jars. Another method of preparing the preserves is to place them in the jars and boil the preserves in these vessels, openings being provided to permit the escape of steam; when cool enough, so that the steam pressure will not burst the jars, the openings are closed by sealing, soldering or in any other suitable manner, and the jars and the contents are allowed to cool. I provide a vessel closure having an escape valve which permits the escape of steam or other vapors from the jars in excess of a certain pressure, thus adapting the jar particularly well for the boiling of preserves therein as in the last mentioned method. The escape valve is adjustable and can thus be set for any desired pressure. My invention obviates the necessity of soldering or sealing the openings, and automatically prevents the contamination of the preserves by contact with the air.

Referring more particularly to the drawings, 1 represents a fruit jar of the usual type having a suitable threaded neck 2. It should be understood that preserve vessels of any common or preferred type may be employed, provided a cover presenting a surface as shown in the accompanying drawings is used. Screwed upon the threaded neck of the jar is a cover 3 having sides 4 properly threaded; the cover 3 is preferably of zinc or other suitable metal. The top of the cover 4 has an escape opening 6 therethrough to permit the steam or other vapors to pass from the jars. Seating against the top 5 covering the opening 6, is a sealing member 7 preferably in the form of a nut and having at its under side a threaded recess 8. A washer 9, preferably of rubber or similar material is provided between the top 5 and the member 7, to insure the hermetical sealing of the escape opening. I provide a stem 10 preferably comprising a screw having a threaded shank 11 and a head 12. The stem 10 is mounted in the threaded recess of the member 7 and extends through the opening 6 to the inner side of the head.

A leaf spring 13 having an opening 14 near the middle and with the ends 15 laterally disposed at an angle with the body of the spring, is provided at the inner side of the cover, engaging with the head 12 of the stem 10. The extremities of the spring 13 are curved to a form thus adapted to rest slidably against the inner side of the cover. It will be understood that the spring resiliency holds the member 7 covering the opening 6, the tension of the spring depending upon the relative adjustment of the member and the stem; thus the escape valve can be set for any desired pressure by merely turning the nut member to shorten or lengthen the portion of the stem extending through the cover to the under side thereof. If so desired, the leaf spring 13 may be replaced by a helical spring, mounted upon the stem and engaging with the head 12 and the inner side of the cover.

Having thus described my invention, I claim as new and desire to secure by Letters Patent:

1. A vessel closure, comprising a removable cover having an opening, a member adapted to close said opening, and means on the inner side of said cover for resiliently holding said member in position to seal said opening, and means operable from the outer side of said cover for adjusting said holding means.

2. A vessel closure, comprising a removable cover having an opening, a member seating against said cover to seal said opening, and adjustable means on the inner side of said cover for holding said member resiliently in position to seal said opening.

3. A vessel closure, comprising a removable cover having an opening, a member seating against said cover to seal said opening and having an adjustable stem extending through said opening, and means on the inner side of said cover for resiliently engaging said stem to hold said member in position to seal said opening.

4. A vessel closure, comprising a removable cover having an opening, a member seating against said cover to seal said opening, a washer between said cover and said member, a stem adjustably mounted upon said member and extending through said opening to the inner side of said cover, and a spring resting against the inner side of said cover and engaging said stem resiliently to hold said member in position to seal said opening.

In testimony whereof I have signed my name to this specification in the presence of two subscribing witnesses.

WALTER HENRY PREST.

Witnesses:
 B. W. BURNS,
 JOHN P. MARTIN.